US010892636B2

(12) United States Patent
Bemat et al.

(10) Patent No.: US 10,892,636 B2
(45) Date of Patent: Jan. 12, 2021

(54) PLUG-IN BACKUP ENERGY DEVICES

(71) Applicant: Hewlett Packard Enterprise Development LP, Houston, TX (US)

(72) Inventors: Mohamed Amin Bemat, Cypress, TX (US); Kirk Yates, Sacramento, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 272 days.

(21) Appl. No.: 15/941,288

(22) Filed: Mar. 30, 2018

(65) Prior Publication Data
US 2019/0305586 A1    Oct. 3, 2019

(51) Int. Cl.
*H02J 9/06*  (2006.01)
*H02J 7/00*  (2006.01)
*G06F 1/30*  (2006.01)
*H01R 107/00*  (2006.01)
*H01R 24/62*  (2011.01)

(52) U.S. Cl.
CPC ............... *H02J 9/061* (2013.01); *G06F 1/30* (2013.01); *H02J 7/0068* (2013.01); *H01R 24/62* (2013.01); *H01R 2107/00* (2013.01)

(58) Field of Classification Search
CPC ..... H01R 24/62; H01R 2107/00; G06F 1/263; G06F 1/30; H02J 7/0068; H02J 9/061
See application file for complete search history.

(56) References Cited

U.S. PATENT DOCUMENTS

| 7,710,075 | B1 | 5/2010 | Kilbourne, II et al. | |
| 9,167,718 | B2 | 10/2015 | Jau et al. | |
| 9,479,004 | B2 | 10/2016 | Mao | |
| 9,515,419 | B2 | 12/2016 | Inskeep | |
| 9,678,910 | B2 | 6/2017 | Breakstone et al. | |
| 2015/0022154 | A1* | 1/2015 | Kim | H02J 7/007 320/114 |
| 2015/0091497 | A1* | 4/2015 | Leung | H02J 7/00 320/107 |
| 2016/0315490 | A1* | 10/2016 | Xu | H02J 7/342 |
| 2016/0329732 | A1* | 11/2016 | Koyama | H02J 7/342 |

(Continued)

OTHER PUBLICATIONS

Linear Technology; "2A Bidirectional Buck-Boost DC/DC Regulator and Charger/Balancer"; printed from: http://cds.linear.com/docs/en/datasheet/3110fb.pdf on Sep. 13, 2017; 36 pages.

*Primary Examiner* — Carlos Amaya
*Assistant Examiner* — Esayas G Yeshaw
(74) *Attorney, Agent, or Firm* — Brooks, Cameron & Huebsch, PLLC (57) ABSTRACT

Example implementations relate to plug-in backup energy devices. In some examples, a plug-in backup energy device may comprise a charger, an energy storage device coupled to the charger, and a buck-boost converter coupled to the charger and the energy storage device such that the buck-boost converter maintains a charge of the energy storage device during a no-fault mode of a computing device, and in response to the plug-in backup energy device switching from a normal mode to a power supply mode as a result of the computing device experiencing a fault, regulates a voltage output of the energy storage device to provide energy to the computing device during the fault of the computing device.

20 Claims, 4 Drawing Sheets

(56) References Cited

U.S. PATENT DOCUMENTS

2017/0005494 A1\* 1/2017 Li ........................... G06F 1/263
2017/0194806 A1   7/2017 Inskeep
2018/0019587 A1\* 1/2018 Chen .................... H02H 7/1213

\* cited by examiner

PLUG-IN BACKUP ENERGY DEVICES

BACKGROUND

A computing device can utilize a backup energy device in an event in which the computing device experiences a fault. For example, if the computing device were to lose power, a backup energy device can supply energy to the computing device.

DETAILED DESCRIPTION

A backup energy device can be utilized to provide energy to a computing device in the event the computing device experiences a fault. As used herein, the term "backup energy device" can, for example, refer to an electrical device that provides energy to a computing device when the computing device experiences an interruption of an input power to the computing device. The backup energy device can plug-in to the computing device. For example, the backup energy device can be inserted into a receptacle of the computing device. As used herein, the term "computing device" can, for example, refer to a laptop computer, a desktop computer, a server, storage and/or networking equipment, among other types of computing devices. As used herein, the term "fault" can, for example, refer to an event in which a computing device experiences a loss of power, such as the input power being lowered and/or interrupted, among other examples. In some examples, a fault can include a reduction in power, such as a brownout. As used herein, the term "brownout" can, for example, refer to a drop in voltage of an electrical power supply system.

Power loss to a computing device can cause data to be at risk. For example, data stored in Random Access Memory (RAM) can be at risk of corruption in a fault event scenario. For instance, data stored in RAM may be corrupted if the computing device loses power before the data stored in the RAM is stored in long term memory, such as to a hard disk, flash memory, etc.

In some examples, an uninterruptible power supply (UPS) and/or multiple independent alternating-current (AC) power sources may be used to prevent data corruption in a fault event scenario. However, a UPS may be large and not able to fit in certain spaces where the computing device is located. Multiple independent AC power sources can include dual AC paths to the computing device, which may be complex. Further, both the UPS and/or the multiple AC power sources can be cost prohibitive to implement.

In some implementations, plug-in backup energy devices can allow for a smaller and lower cost way to provide backup energy to the computing device in a fault event scenario than a UPS or multiple independent AC power sources. The plug-in backup energy device can allow the computing device to cache data stored in RAM during a fault event to prevent the data from being corrupted.

Figure 1A:
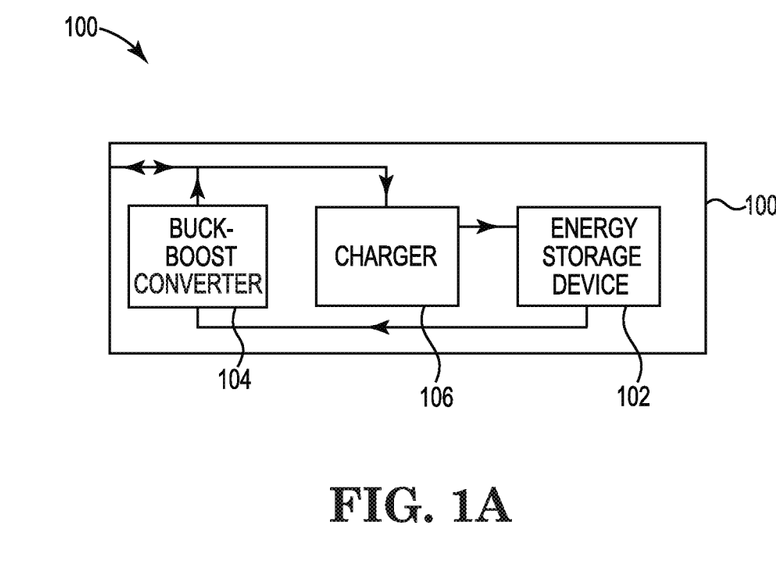
FIG. 1A is a diagram of an example of a plug-in backup energy device consistent with the disclosure.

FIG. 1A is a diagram of an example of a plug-in backup energy device 100 consistent with the disclosure. As illustrated in FIG. 1A, plug-in backup energy device 100 can include energy storage device 102, buck-boost converter 104, and charger 106.

As illustrated in FIG. 1A, plug-in backup energy device 100 can include energy storage device 102. As used herein, the term "energy storage device" can, for example, refer to an electrical device that can store electrical energy. For example, energy storage device 102 can store electrical energy.

In some examples, energy storage device 102 can include a battery. As used herein, the term "battery" can, for example, refer to a device including electrochemical cells with external connections to power an electrical device. For example, energy storage device 102 can include electrochemical cells to power an electrical device such as a computing device, as is further described in connection with FIG. 2.

Although energy storage device 102 is described above as being a battery, examples of the disclosure are not so limited. For example, energy storage device 102 can be a capacitor, or any other type of electrical device which can store electrical energy.

Plug-in backup energy device 100 can include charger 106. As used herein, the term "charger" can, for example, refer to a device to put energy into energy storage device 102 by forcing an electric current through it. For example, charger 106 can charge energy storage device 102, as is further described herein. Charger 106 can be connected to energy storage device 102.

Plug-in backup energy device 100 can include buck-boost converter 104. As used herein, the term "buck-boost converter" can, for example, refer to a type of direct-current (DC) to DC converter that includes an output voltage magnitude that is either greater than or less than the input voltage magnitude. Buck-boost converter 104 can be connected to energy storage device 102.

Charger 106 can maintain a charge of energy storage device 102 during a no-fault mode of a computing device. As used herein, the term "no-fault mode" can, for example, refer to an operating mode of a computing device at which the computing device is receiving power. For example, the computing device can be receiving power during the operating mode of the computing device such that the computing device can perform various computing device related functions.

In some examples, during the no-fault mode of the computing device, buck-boost converter 104 can maintain a charge of energy storage device 102. For example, energy storage device 102 can include an energy storage capacity. As used herein, the term "energy storage capacity" can, for example, refer to a capacity to which energy storage device 102 can store energy. In some examples, buck-boost converter 104 can provide energy to energy storage device 102 to charge energy storage device 102. For instance, buck-boost converter 104 can receive an input DC voltage (e.g., from a computing device) and output a DC voltage such to charge energy storage device 102 to the energy storage capacity of energy storage device 102. In some examples, buck-boost converter 104 can maintain the energy storage capacity of energy storage device 102.

In some examples, during the no-fault mode of the computing device, charger 106 can maintain a charge of energy storage device 102. Charger 106 can provide energy to energy storage device 102 to charge energy storage device 102. For instance, charger 106 can receive an input DC voltage (e.g., from a computing device) and output a DC voltage to charge energy storage device 102 to the energy storage capacity of energy storage device 102. In some examples, charger 106 can maintain the energy storage capacity of energy storage device 102.

During a no-fault mode of a computing device, plug-in backup energy device 100 can operate in a normal mode. As used herein, the term "normal mode" can, for example, refer to a mode in which plug-in backup energy device 100 charges and/or maintains a charge of energy storage device 102. For example, plug-in backup energy device 100 can charge and/or maintain a charge of energy storage device 102 when no faults are occurring in the computing device.

Plug-in backup energy device 100 can switch from the normal mode to a power supply mode in response to the computing device experiencing a fault. As used herein, the term "power supply mode" can, for example, refer to a mode in which plug-in backup energy device 100 provides energy to a computing device when a fault occurs in the computing device. For example, the computing device may experience a brown-out condition, lose AC input power, etc. As a result of the fault condition, plug-in backup energy device 100 can switch from the normal mode to the power supply mode.

While in the power supply mode, plug-in backup energy device 100 can provide energy to the computing device. For example, energy storage device 102 can provide energy to the computing device to allow the computing device to cache data, as is further described in connection with FIG. 3.

Buck-boost converter 104 can regulate the voltage output by energy storage device 102 to a predetermined voltage in response to the fault of computing device. For example, energy storage device 102 may output 8 volts (V) to 4 V. Buck-boost converter 104 can regulate the voltage output by energy storage device 102 to a predetermined voltage of 5V. For instance, the computing device may demand 5V in order to cache data stored in RAM. Buck-boost converter 104 can regulate the voltage output by energy storage device 102 from 4V to the predetermined voltage of 5V.

Although the predetermined voltage of the computing device is described above as being 5V, examples of the disclosure are not so limited. For example, the predetermined voltage can be any other voltage, and the buck-boost converter 104 can boost the voltage output by energy storage device 102 to the predetermined voltage.

Energy storage device 102 can provide a voltage output while the stored energy of energy storage device 102 depletes. Energy storage device 102 can provide a voltage output to buck-boost converter 104 while the stored energy of energy storage device 102 depletes.

As the stored energy of energy storage device 102 depletes, the output voltage of energy storage device 102 may be reduced. For example, the energy storage device 102 may begin providing a voltage output of 8V. As time passes, energy storage device 102 may start providing a voltage output of 4V, 3V, etc. In other words, the voltage output of energy storage device 102 can decrease over time as energy storage device 102 provides energy to the computing device.

Buck-boost converter 104 can regulate the voltage output of energy storage device 102 as the voltage output of energy storage device 102 decreases over time. For example, energy storage device 102 may begin providing a voltage output of 8V, but after an amount of time the energy storage device 102 outputs a voltage output of 3V. Buck-boost converter 104 can regulate the voltage from 3V to the predetermined voltage (e.g., 5V) to be provided to the computing device.

Energy storage device 102 can provide energy to the computing device during the power supply mode until a threshold voltage capacity of energy storage device 102 is reached. For example, the threshold voltage capacity of energy storage device 102 may be 1V. Energy storage device 102 can provide energy to the computing device during the power supply mode until the voltage output of energy storage device 102 reaches 1V.

Buck-boost converter 104 can cut off power to the computing device from energy storage device 102 in response to the threshold voltage output being reached. Continuing with the example above, energy storage device 102 can provide energy to the computing device during the power supply mode until the voltage output of energy storage device 102 reaches 1V. When the voltage output of energy storage device 102 reaches 1V, buck-boost converter 104 can cut off power to the computing device. Buck-boost converter 104 can cut off power to the computing device at the threshold voltage output in order to avoid completely depleting energy storage device 102.

Although the threshold voltage output is described above as being 1V, examples of the disclosure are not so limited. For example, the threshold voltage output can be any other voltage.

Buck-boost converter 104 can include current and/or voltage sensors to determine the voltage output of energy storage device 102. However, examples of the disclosure are not so limited. For example, charger 106 can include current and/or voltage sensors to determine the voltage output of energy storage device 102.

Figure 1B:
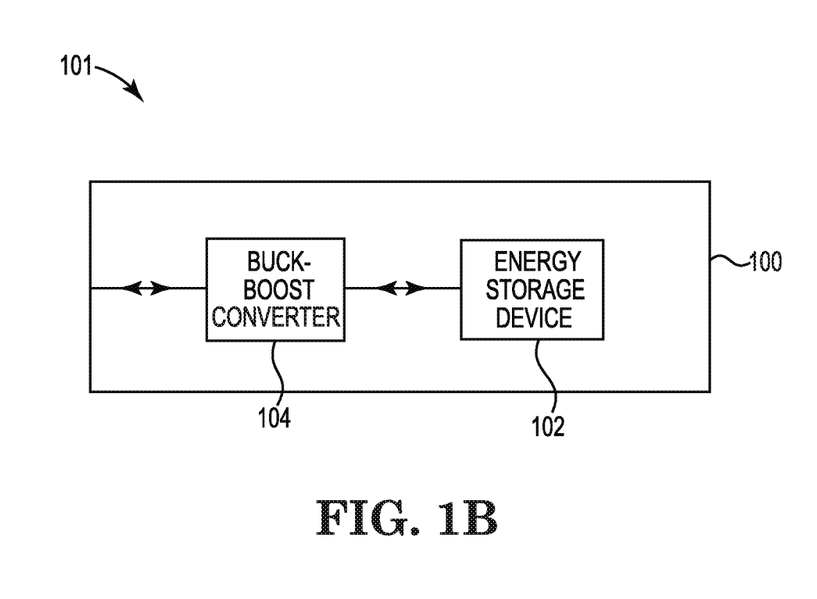
FIG. 1B is a diagram of an example of a plug-in backup energy device consistent with the disclosure.

FIG. 1B is a diagram of an example of a plug-in backup energy device 101 consistent with the disclosure. As illustrated in FIG. 1B, plug-in backup energy device 101 can include energy storage device 102 and buck-boost converter 104.

As illustrated in FIG. 1B, plug-in backup energy device 101 can include energy device 102, as well as buck-boost converter 104. In the example illustrated in FIG. 1B, buck-boost converter 104 can charge energy storage device 102, maintain a charge of energy storage device 102 during a no-fault mode of a computing device, and regulate a voltage output of energy storage device 102 in response to a fault of the computing device, as is further described herein.

In some examples, buck-boost converter 104 can charge energy storage device 102. For example, during a no-fault mode of the computing device, buck-boost converter 104 can receive an input DC voltage (e.g., from a computing device) and output a DC voltage such that buck-boost converter 104 can charge energy storage device 102 to the energy storage capacity of energy storage device 102. In other words, buck-boost converter 104 can act as a charger during a no-fault mode of the computing device to charge energy storage device 102, and to maintain the charge of energy storage device 102, as previously described in connection with FIG. 1A.

As previously described in connection with FIG. 1A, plug-in backup energy device 101 can switch from the normal mode to a power supply mode in response to the computing device experiencing a fault. While in the power supply mode, plug-in backup energy device 101 can provide energy to the computing device. For example, energy storage device 102 can provide energy to the computing device to allow the computing device to cache data.

Similar to plug-in backup energy device 100, previously described in connection with FIG. 1A, buck-boost converter 104 can regulate the voltage output by energy storage device 102 to a predetermined voltage in response to the fault of computing device. Buck-boost converter 104 can regulate the voltage output of energy storage device 102 as the voltage output of energy storage device 102 decreases over time. Energy storage device 102 can provide energy to the computing device during the power supply mode until a threshold voltage capacity of energy storage device 102 is reached, at which point buck-boost converter can cut off power to the computing device from energy storage device 102.

Figure 2:
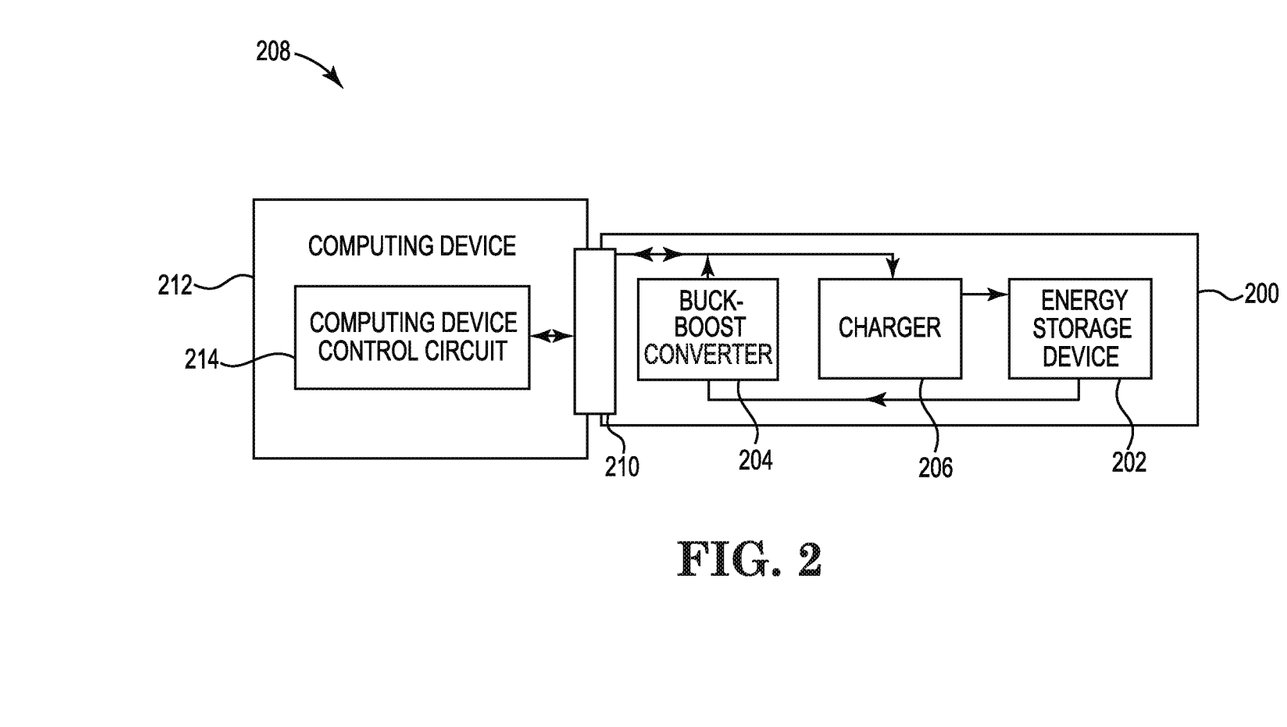
FIG. 2 is a diagram of an example system for plug-in backup energy devices consistent with the disclosure.

FIG. 2 is a diagram of an example system 208 for plug-in backup energy devices consistent with the disclosure. As illustrated in FIG. 2, the system 208 can include computing device 212, universal serial bus (USB) connection 210, and plug-in backup energy device 200. Plug-in backup energy device 200 can include energy storage device 202, buck-boost converter 204, and charger 206. Computing device 212 can include computing device control circuit 214.

As illustrated in FIG. 2, computing device 212 can include computing device control circuit 214. As used herein, the term "computing device control circuit" can, for example, refer to a circuit included in computing device 212 to allow a bi-directional flow of energy between computing device 212 and plug-in backup energy device 200. For example, computing device control circuit 214 can allow computing device 212 to charge energy storage device 202 and/or allow energy storage device 202 to power computing device 212. Computing device control circuit 214 can include no-fault field effect transistors (FETs) and fault mode FETs, as is further described in connection with FIG. 3.

Plug-in backup energy device 200 can be connected to computing device 212 via USB connection 210. As used herein, the term "USB" can, for example, refer to a connection between a computing device and a computing device peripheral to communicate and/or supply electric energy between the computing device and the computing device peripheral. For example, computing device 212 and plug-in backup energy device 200 can communicate and/or supply electric energy between computing device 212 and plug-in backup energy device 200, as is further described herein.

As illustrated in FIG. 2, plug-in backup energy device 200 includes energy storage device 202, buck-boost converter 204, and charger 206. Computing device 212 can supply energy to energy storage device 202 during a no-fault mode of computing device 212. For example, computing device 212 can supply energy to charger 206 via USB connection 210, where charger 206 can then provide the energy to energy storage device 202. Charger 206 can charge energy storage device 202 if energy storage device 202 is not at the energy storage capacity of energy storage device 202 during the no-fault mode of computing device 212. Charger 206 can maintain the energy storage capacity of energy storage device 202 if energy storage device 202 is at the energy storage capacity of energy storage device 202 during the no-fault mode of computing device 212.

Although plug-in backup energy device 200 is illustrated in FIG. 2 as including energy storage device 202, buck-boost converter 204, and charger 206, examples of the disclosure are not so limited. For example, as previously described in connection with FIG. 1B, plug-in energy device 200 can include energy storage device 202 and buck-boost converter 204, but not charger 206. In some examples, buck-boost converter 204 can charge energy storage device 202, maintain a charge of energy storage device 202 during a no-fault mode of a computing device, and regulate a voltage output of energy storage device 202 in response to a fault of the computing device.

Plug-in backup energy device 200 can switch from the normal mode to a power supply mode in response to the computing device experiencing a fault. For example, in response to a fault of the computing device occurring, buck-boost converter 204 can regulate voltage output of energy storage device 202 to a predetermined voltage. The predetermined voltage can provide energy to computing device control circuit 214 of computing device 212 via USB connection 210.

Figure 3:
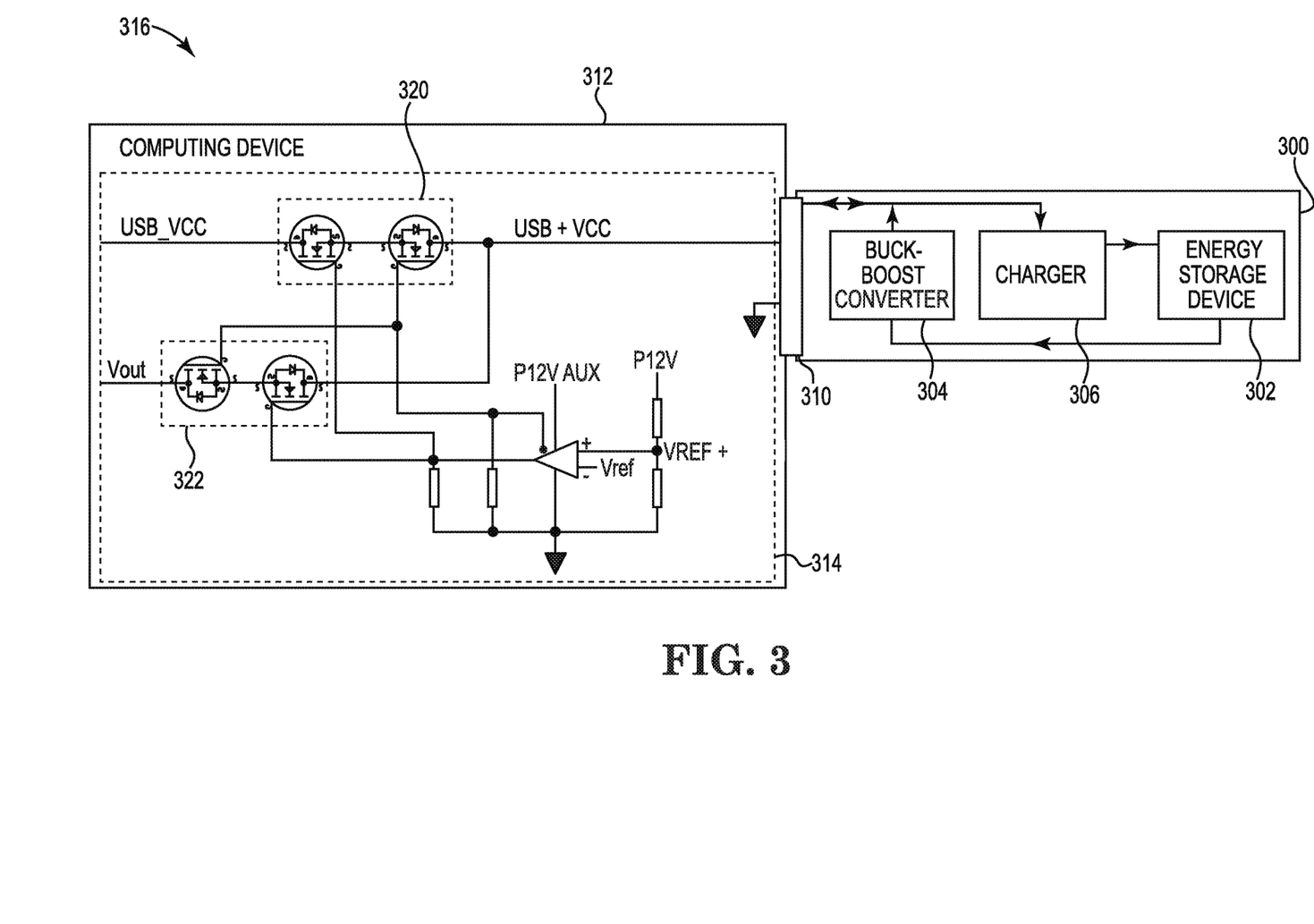
FIG. 3 is a diagram of an example system for plug-in backup energy devices consistent with the disclosure.

FIG. 3 is a diagram of an example system 316 for plug-in backup energy devices consistent with the disclosure. As illustrated in FIG. 3, the system 316 can include computing device 312, universal serial bus (USB) connection 310, and plug-in backup energy device 300. Plug-in backup energy device 300 can include energy storage device 302, buck-boost converter 304, and charger 306. Computing device 312 can include computing device control circuit 314.

As illustrated in FIG. 3, computing device 312 can include computing device control circuit 314. For example, computing device control circuit 314 can allow computing device 312 to charge energy storage device 302 and/or allow energy storage device 302 to power computing device 312.

Computing device control circuit 314 can include no-fault mode FETs 320. As used herein, the term "FET" can, for example, refer to a transistor that uses an electric field to control the electrical behavior of a device. For example, no-fault mode FETs 320 can be utilized by computing device 312 during a no-fault mode of computing device 312.

No-fault mode FETs 320 can include one p-channel FET (PFET) and one n-channel FET (NFET). No-fault mode FETs 320 can be utilized during a no-fault mode of computing device 312, as is further described herein.

The PFET and NFET of no-fault mode FETs 320 can be connected in series. As used herein, the term "series" can, for example, refer to an electrical connection along a single path. For example, the PFET and NFET of no-fault mode FETs 320 can be electrically connected along a single path.

Computing device control circuit 314 can include fault mode FETs 322. Fault mode FETs 322 can include one p-channel FET (PFET) and one n-channel PFET. For example, fault mode FETs 322 can be utilized by computing device 312 during a fault mode of computing device 312.

The PFET and NFET of fault mode FETs 322 can be connected in series. For example, the PFET and NFET of fault mode FETs 322 can be electrically connected along a single path Although not shown in FIG. 3 for clarity and so as not to obscure examples of the disclosure, in some examples computing device control circuit 314 can include one fault mode FET and a diode for use during a fault mode of computing device 312 rather than fault mode FETs 322. As used herein, the term "diode" can, for example, refer to a two-terminal electronic component that conducts current primarily in one direction. For example, computing device control circuit 314 can include a PFET and a diode for use during a fault mode of computing device 312.

As illustrated in FIG. 3, system 316 can include USB connection 310. USB connection 310 can connect computing device control circuit 314 to plug-in backup energy device 300.

Buck-boost converter 304 can be connected to charger 306 and energy storage device 302. In some examples, computing device 312 can supply energy to plug-in backup energy device 300. For example, utilizing no-fault mode FETs 320, computing device control circuit 314 can supply energy to buck-boost converter 304 and charger 306 via USB connection 310 such that charger 306 can charge energy storage device 302 while computing device 312 is in a no-fault mode until energy storage device 302 has reached its energy storage capacity while plug-in backup energy device 300 is in a normal mode.

Although plug-in backup energy device 300 is illustrated in FIG. 3 as including energy storage device 302, buck-boost converter 304, and charger 306, examples of the disclosure are not so limited. For example, as previously described in connection with FIG. 1B, plug-in energy device 300 can include energy storage device 302 and buck-boost converter 304, but not charger 306. In some examples, buck-boost converter 304 can charge energy storage device 302, maintain a charge of energy storage device 302 during a no-fault mode of computing device 312, and regulate a voltage output of energy storage device 302 in response to a fault of computing device 312.

Buck-boost converter 304 can maintain the energy storage capacity once reached using energy supplied by no-fault mode FETs 320 during a no-fault mode of computing device 312 via USB connection 310. For example, while computing device 312 is in a no-fault mode (e.g., computing device 312 has power), computing device 312 can supply energy to buck-boost converter 304 and charger 306 via USB connection 310 to maintain an energy storage capacity (e.g., a charge) of energy storage device 302 while plug-in backup energy device 300 is in a normal mode.

Buck-boost converter 304 or charger 306 can maintain the energy storage capacity of energy storage device 302. For example, in response to energy storage device 302 being at its energy storage capacity, buck-boost converter 304 or charger 306 can change its operating mode from charging to maintaining the energy storage capacity of energy storage device 302. Buck-boost converter 304 or charger 306 can maintain the energy storage capacity of energy storage device 302 until computing device 312 has a fault.

Although not illustrated in FIG. 3 for clarity and so as not to obscure examples of the disclosure, plug-in backup energy device 300 can include a microcontroller. The microcontroller can be connected to computing device 312 via USB connection 310.

In some examples, the microcontroller can determine charge characteristics of energy storage device 302. For example, the microcontroller can determine an energy storage capacity level of energy storage device 302. For instance, the energy storage capacity level of energy storage device 302 can be 8V.

In some examples, the microcontroller can transmit the charge characteristics of energy storage device 302 to computing device 312. For example, continuing with the example from above, microcontroller can determine the energy storage capacity level of energy storage device 302 to be 8V. The microcontroller can transmit the 8V energy storage capacity level of energy storage device 302 to computing device 312. Computing device 312 can display the energy storage capacity level and/or other charge characteristics of energy storage device 302 such that a user can determine the energy storage capacity level of energy storage device 302, whether plug-in backup energy device 300 should be replaced, etc.

Although charge characteristics of energy storage device 302 are described above as being determined and transmitted by the microcontroller, examples of the disclosure are not so limited. For example, the microcontroller can determine and transmit other characteristics of plug-in backup energy device 300, such as voltages, currents, and/or other electrical characteristics at charger 306, buck-boost converter 304, USB connection 310, etc.

In response to computing device 312 experiencing a fault, computing device 312 can switch off no-fault mode FETs 320. As a result of no-fault mode FETs 320 being switched off, energy storage device 302 can provide energy to computing device 312. For example, energy storage device 302 can provide energy to computing device control circuit 314 via USB connection 310.

Energy storage device 302 can provide energy to computing device 312 while the energy storage capacity level of energy storage device 302 depletes. For example, energy storage device 302 can provide an initial voltage output when energy storage device 302 is at an energy storage capacity. The voltage output of energy storage device 302 can decrease as the energy storage capacity of energy storage device 302 depletes. For instance, the initial voltage output when energy storage device 302 is at its energy storage capacity can be 8V. The voltage output of energy storage device 302 may decrease to 3V as the energy storage capacity of energy storage device 302 depletes.

Buck-boost converter 304 can regulate a voltage output of energy storage device 302 to a predetermined voltage to provide energy to fault mode FETs 322. Continuing with the example above, the voltage output of energy storage device 302 may decrease from 8V to 3V as the energy storage capacity of energy storage device 302 depletes. Buck-boost converter 304 can regulate the voltage output of energy storage device 302 from 8V to 3V to the predetermined voltage (e.g., 5V) to provide energy to computing device control circuit 314.

Buck-boost converter 304 can regulate the voltage output of energy storage device 302 and provide energy to computing device control circuit 314 at the predetermined voltage during the power supply mode of plug-in backup energy device 300 until energy storage device 302 reaches a threshold voltage capacity. For example, the threshold voltage capacity of energy storage device 302 can be 1V. Energy storage device 302 can provide energy to computing device 312 during the power supply mode until the voltage output of energy storage device 302 reaches 1V.

Buck-boost converter 304 can cut off power to computing device 312 in response to the voltage output of energy storage device 302 reaching 1V. Buck-boost converter 304 can cut off power to computing device 312 at the threshold voltage output in order to avoid completely depleting energy storage device 302.

Computing device 312 can cache data in response to the fault occurring while plug-in backup energy device 300 is providing energy to computing device 312. As used herein, the term "cache" can, for example, refer to storing data. For example, data may be in transit between RAM and permanent storage memory and/or between RAM and a central processing unit (CPU) in computing device 312 when computing device 312 experiences a fault. Using the energy received by fault mode FETs 322 from energy storage device 302 of plug-in backup energy device 300, computing device 312 can cache the in transit data to avoid the data being corrupted due to a sudden power loss.

Plug-in backup energy devices, according to the disclosure, can allow for caching of data to avoid corruption of the data in the event of a fault of a computing device, such as a sudden power loss to the computing device. Utilizing a USB connection, plug-in backup energy devices can be located on a front portion of the computing device, providing easy access to the plug-in backup energy devices. Further, the plug-in backup energy device may be separated from areas of high temperature such as a back portion of the computing device, where fans or other devices may be removing heat from the computing device, prolonging a life span of the plug-in backup energy device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1A, and a similar element may be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. As used herein, "a plurality of" an element and/or feature can refer to more than one of such elements and/or features.

What is claimed:

1. A plug-in backup energy device, comprising:
   a connector to insert into a receptacle of a computing device;
   an energy storage device; and
   a buck-boost converter coupled to the energy storage device such that the buck-boost converter:
      maintains a charge of the energy storage device during a no-fault mode of the computing device; and
      in response to the plug-in backup energy device switching from a normal mode to a power supply mode as a result of the computing device experiencing a fault, regulates a voltage output of the energy storage device to provide energy to the computing device via the connector during the fault of the computing device
   wherein the plugin backup energy device receives power for maintaining the charge of the energy storage device from the computing device via the connector.

2. The plug-in backup energy device of claim 1, wherein the buck-boost converter regulates the voltage output by the energy storage device in the power supply mode to a predetermined voltage.

3. The plug-in backup energy device of claim 2, wherein the connector establishes a universal serial bus (USB) connection between the plug-in backup energy device and the computing device for supplying the predetermined voltage to the computing device.

4. The plug-in backup energy device of claim 1, wherein the energy storage device provides energy to the computing device during the power supply mode until a threshold voltage output of the energy storage device is reached.

5. The plug-in backup energy device of claim 4, wherein the buck-boost converter cuts off power to the computing device from the energy storage device in response to the threshold voltage output being reached.

6. The plug-in backup energy device of claim 1, wherein the energy storage device is a battery.

7. The plug-in backup energy device of claim 1, wherein the energy storage device is a capacitor.

8. The plug-in backup energy device of claim 1, wherein the plug-in backup energy device includes a microcontroller to:
   determine charge characteristics of the energy storage device; and
   transmit the charge characteristics to the computing device.

9. A system, comprising:
   a computing device, including a computing device control circuit;
   a plug-in backup energy device connected to the computing device via a universal serial bus (USB) connection, wherein the plug-in backup energy device includes:
      a charger;
      an energy storage device coupled to the charger; and
      a buck-boost converter coupled to the energy storage device such that the charger:
         maintains a charge of the energy storage device during a no-fault mode of the computing device, the plug-in backup energy device receiving power to maintain the charge of the energy storage device via the USB connection;
         in response to a fault of the computing device, regulates a voltage output of the energy storage device to a predetermined voltage; and
         based on the predetermined voltage, provides energy to the computing device control circuit of the computing device via the USB connection in a power supply mode.

10. The system of claim 9, wherein the energy storage device provides energy to the computing device control circuit at the predetermined voltage during the power supply mode until the energy storage device reaches a threshold voltage capacity.

11. The system of claim 9, wherein the energy storage device provides energy to the computing device control circuit at the predetermined voltage during the power supply mode until an output current of the energy storage device reaches a threshold current.

12. The system of claim 9, wherein the computing device control circuit includes:
   no-fault mode field effect transistors (FETs); and
   fault mode FETs.

13. The system of claim 12, wherein an energy storage capacity of the energy storage device is maintained by the no-fault mode FETs during a no-fault mode of the computing device.

14. The system of claim 12, wherein the no-fault mode FETs are switched off such that the energy storage device provides energy to the computing device via the fault mode FETs in response to the computing device experiencing a fault.

15. A computing device, comprising:
   a computing device control circuit, including:
      no-fault mode field effect transistors (FETs); and
      fault mode FETs;
   a universal serial bus (USB) connection, wherein the USB connection connects the computing device control circuit to a plug-in backup energy device that includes:
      a charger;
      an energy storage device coupled to the charger; and
      a buck-boost converter coupled to the charger and the energy storage device such that the charger:
         maintains a charge of the energy storage device during a no-fault mode of the computing device via the USB connection, the plug-in backup energy device receiving power to maintain the charge of the energy storage device via the USB connection;

in response to the computing device experiencing a fault, regulates a voltage output of the energy storage device to a predetermined voltage; and based on the predetermined voltage, provides energy to the fault mode FETs via the USB connection until the energy storage device reaches a threshold voltage capacity.

16. The computing device of claim 15, wherein the computing device caches, in response to the fault occurring, data in transit between a central processing unit (CPU) and Random Access Memory of the computing device using the energy received by the fault mode FETs from the energy storage device of the plug-in backup energy device.

17. The computing device of claim 15, wherein the no-fault mode FETs provide energy to the plug-in backup energy device via the USB connection such that the charger or the buck-boost converter charge the energy storage device until the energy storage device has reached an energy storage capacity.

18. The computing device of claim 17, wherein the buck-boost converter or the charger maintains the energy storage capacity of the energy storage device in response to the energy storage device being at its energy storage capacity until the computing device has the fault.

19. The computing device of claim 15, wherein the fault includes a loss of power to the computing device.

20. The computing device of claim 15, wherein the fault includes a reduction in power to the computing device.

* * * * *